United States Patent [19]

Frankel et al.

[11] Patent Number: 4,745,290
[45] Date of Patent: May 17, 1988

[54] METHOD AND APPARATUS FOR USE IN MAKING CUSTOM SHOES

[76] Inventors: David Frankel, 1942 S. Pelham, No. 9, Los Angeles, Calif. 90025; Leo Beiser, 151-77 28th Ave., Flushing, N.Y. 11354

[21] Appl. No.: 27,798

[22] Filed: Mar. 19, 1987

[51] Int. Cl.⁴ .................... G01B 11/24; A43D 00/00
[52] U.S. Cl. .................... 250/560; 356/376; 12/146 L
[58] Field of Search .......... 250/560; 356/376, 380, 356/387; 12/146 L

[56] References Cited

U.S. PATENT DOCUMENTS

| | | | |
|---|---|---|---|
| 3,696,456 | 10/1972 | Dunham et al. | 12/146 |
| 4,227,813 | 10/1980 | Pirlet | 356/372 |
| 4,406,544 | 9/1983 | Takada | 356/376 |
| 4,454,618 | 6/1984 | Curchod | 12/146 |
| 4,534,365 | 8/1985 | Bonetta | 128/779 |
| 4,569,358 | 2/1986 | Gormley | 128/774 |
| 4,575,805 | 3/1986 | Moermann | 364/474 |
| 4,600,016 | 7/1986 | Boyd | 128/782 |

OTHER PUBLICATIONS

M. Rioux, Laser Range Finder Based on Synchronized Scanners, Appl. Opt., vol. 23, 1984.

Primary Examiner—Edward P. Westin
Assistant Examiner—Khaled Shami
Attorney, Agent, or Firm—Martin M. Novack

[57] ABSTRACT

The disclosure is directed to a method and apparatus for making a custom shoe based on non-contact measurements of a particular subject's foot. A foot is placed at an inspection position, and a laser beam is directed at the foot, and scanned in a predetermined pattern over the surface of the foot. The light beam reflected from the foot is detected at a position detector. Surface coordinates of the foot are determined as a function of the detector output. The determined surface coordinates are stored and can then be used in making a shoe having a shape which depends on the stored coordinates. In a preferred embodiment, a rotating scanner is disposed above the inspection position and an oscillating reflector is disposed to one side of the inspection position. The beam of light is reflected from the rotating scanner to the oscillating reflector to the foot, and the beam reflected from the foot is thereafter reflected back to the oscillating reflector, the rotating scanner, and then the detector.

22 Claims, 3 Drawing Sheets

METHOD AND APPARATUS FOR USE IN MAKING CUSTOM SHOES

BACKGROUND OF THE INVENTION

This invention relates to improvements in making shoes and, more particularly, to a method and apparatus for determining the coordinates of a foot, and then making a custom shoe having a shape that depends upon the determined coordinates.

A substantial fraction of the population has a problem obtaining shoes that fit properly and comfortably. Unfortunately, custom-made shoes are presently out of economic reach for most people. Also, inaccuracies in obtaining foot measurements can result in custom-made shoes that are still unsatisfactory.

Various techniques have been proposed in the past for obtaining foot measurements using mechanical means, and then fabricating a custom shoe last from the measurements. For example, in the U.S. Pat. No. 3,696,456 there is disclosed a foot contour measuring device that employs a multiplicity of plastic-tipped "needle-like probes" which are attached to pistons. The probes are urged against the foot, and a variable capacitor is attached to each probe so that the degree of extension of each probe can be determined. Information describing the positions of the probes is converted to produce "foot model data" which is coupled, along with "style model data", to a "last information computer". The information in the computer is utilized, in turn, to control an automatic machine tool for cutting a wooden last on which the custom shoe can be made.

Another mechanical-type of system is disclosed in U.S. Pat. No. 4,454,618, which describes a system and method for forming a custom-made resilient insert for a shoe, based on the contour of the undersurface of a foot.

There are inherent limitations in a mechanical measuring device. First of all, in any contact-type measurement, there is a possibility that the measuring means will disturb the contour it is attempting to measure. Other problems involve possible discomfort to the subject, and long-term unreliability of mechanical components, particularly when a large number of components (such as individual probes) are involved. Further, if the measuring device is relatively complex, with many moving parts (as in U.S. Pat. No. 3,696,456, described above), the equipment will tend to be expensive.

Non-contact measurements using optical techniques have been employed in the prior art for various applications, including measurement of the human body and/or movements of the human body or portions thereof. As examples, reference can be made to the following U.S. Pat. Nos. 4,406,544, 4,575,805, 4,569,358, and 4,600,016. Other prior art patents which deal with measurement of dimensions and with foot analysis are U.S. Pat. Nos. 4,227,813, and 4,534,365.

To Applicant's knowledge, no practical non-contact technique for foot measurement has come into commercial practise. Among the reasons for the absence of such a commercial system or technique is the relative difficulty of obtaining measurements of the foot with accuracy and without undue expense. The two sides of a foot are quite different in contour, and an interrogating medium must achieve appropriate measurements over a substantial portion of the foot surface. The measurements must be made in reasonable time in order to be practical, and the measuring system cannot be unduly complex or expensive.

It is among the objects of the present invention to provide a non-contact method and apparatus for achieving accurate foot measurements without undue complexity, so that custom shoes can be made more readily available to the public at large.

SUMMARY OF THE INVENTION

In accordance with an embodiment of the invention, there is disclosed a method of making a custom shoe, based on a particular subject's foot. The foot is placed at an inspection position, and a focused light beam, preferably a laser beam, is directed at the foot. The light beam is scanned in a predetermined pattern over the surface of the foot. The light beam reflected from the foot is detected at a position detector. The surface coordinates of the foot are determined as a function of the detector output, and are stored. A shoe last can than be formed having a shape which depends on the stored coordinates. Alternatively, if the shoe manufacturing process does not employ a last, the coordinates can be used in control of the particular manufacturing process.

In a preferred embodiment of the invention, the scan is a two-dimensional scan. Also, in this embodiment, a first beam is directed and scanned over one side of the foot, and a second beam is directed and scanned over the other side of the foot. Coordinates of the foot are obtained from both beams. A diffusely reflecting elastic sock is used, in the preferred embodiment hereof, to provide for efficient and uniformly normalized collection of the beams. A triangulation technique can be utilized to obtain distance measurements from the detected beam.

In accordance with an embodiment of the apparatus of the invention, a base is provided for receiving a foot, and defining an inspection position over the base. Means are provided for generating a focused beam of light, preferably a laser beam. A scanning means is operative to scan the beam in a predetermined pattern over the surface of a foot at the inspection position. In the preferred embodiment, the means for scanning the beam comprises a rotating faceted reflector for scanning the beam in one dimension, and an oscillating reflector for scanning the beam in a second dimension. A detector detects the light beam reflected from the foot, and means are provided for determining surface coordinates of the foot as a function of the output of the detector and for storing the determined surface coordinates.

In the preferred embodiment of the apparatus of the invention, the rotating scanner is disposed above the inspection position, and the oscillating reflector is disposed to one side of the inspection position. The beam of light is reflected from the rotating scanner to the oscillating reflector to the foot, and the beam reflected from the foot is thereafter reflected back to the oscillating reflector, the rotating scanner, and then the detector.

Further features and advantages of the invention will become more readily apparent from the following detailed description when taken in conjunction with the accompanying drawings.

DESCRIPTION OF THE PREFERRED EMBODIMENT

Figure 1:
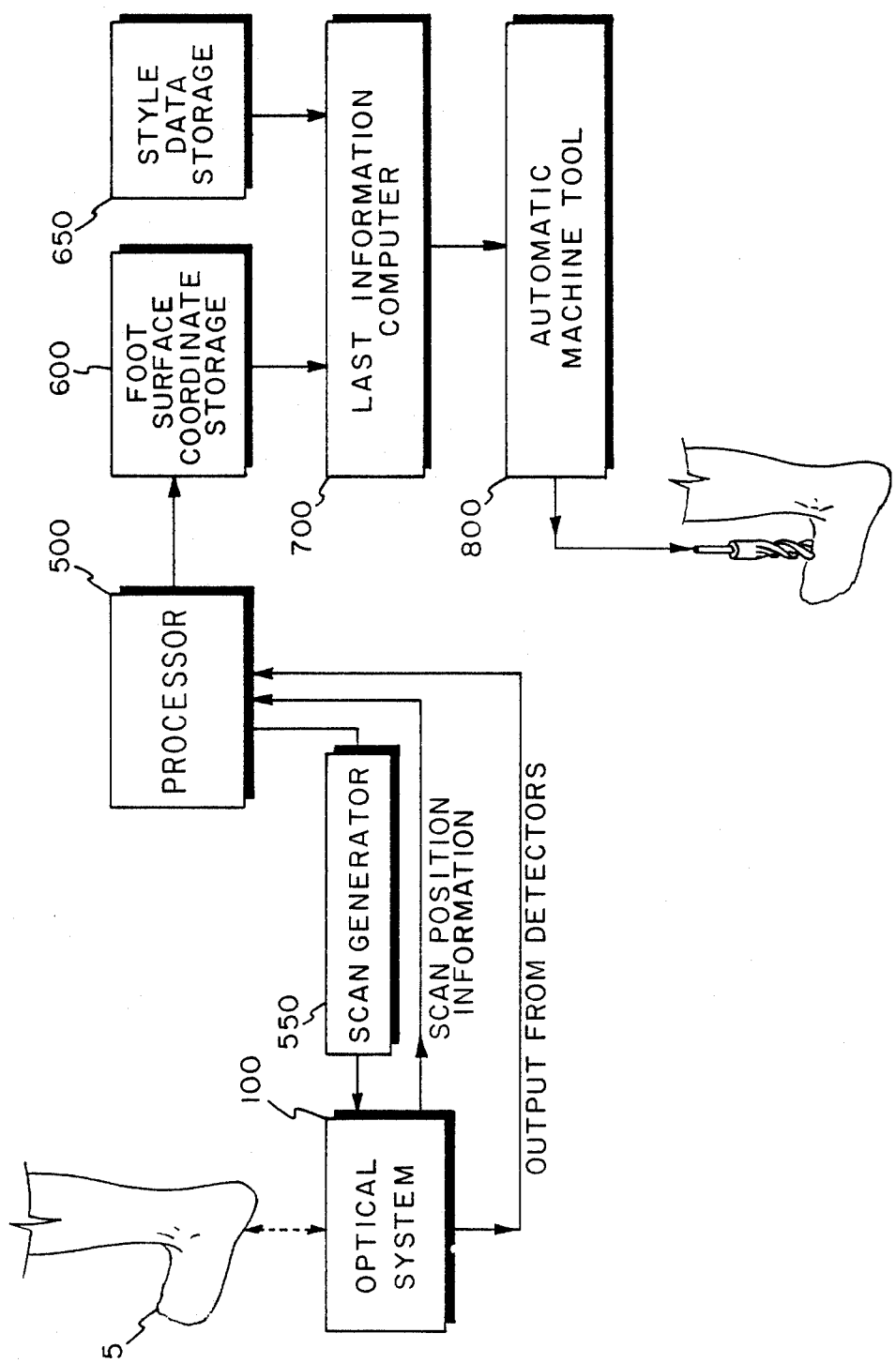
FIG. 1 is a block diagram, partially in simplified schematic form, of an apparatus in accordance with an embodiment of the invention, and which can be used to practice an embodiment of the method of the invention.

Referring to FIG. 1, there is shown a block diagram of a system in accordance with an embodiment of the invention for determining coordinates of the surface of a foot, and making a custom shoe last having a shape which depends upon the determined coordinates. A foot 5 is at an inspection position for interrogation by an optical system 100, which is described hereinbelow in conjunction with FIG. 2. In the described embodiment, the optical system operates to scan the foot with two beams that are scanned, in a manner to be described, under control of signals from a scan generator 550, which is under control of a processor 500. The processor 500 can be any suitable general purpose or special purpose computer, for example an IBM AT Personal Computer, with suitable standard peripheral equipment (not shown). The optical system is operative to produce detector output signals, to be described, which are coupled to the processor 500. Also, signals indicative of the status of the beam scans are coupled to the processor 500.

Foot surface coordinates are determined from the detector outputs, and are stored, for example, in disk storage 600. As is known in the prior art, and described for example in U.S. Pat. No. 3,696,456, the foot surface coordinates can be combined with data representing a desired style (the storage of which is represented by the block 650) in a last information computer 700, and information output therefrom can be used to control an automatic machine tool 800 which cuts a shoe last having a shape which depends upon the foot surface coordinate data and the style data.

Figure 2:
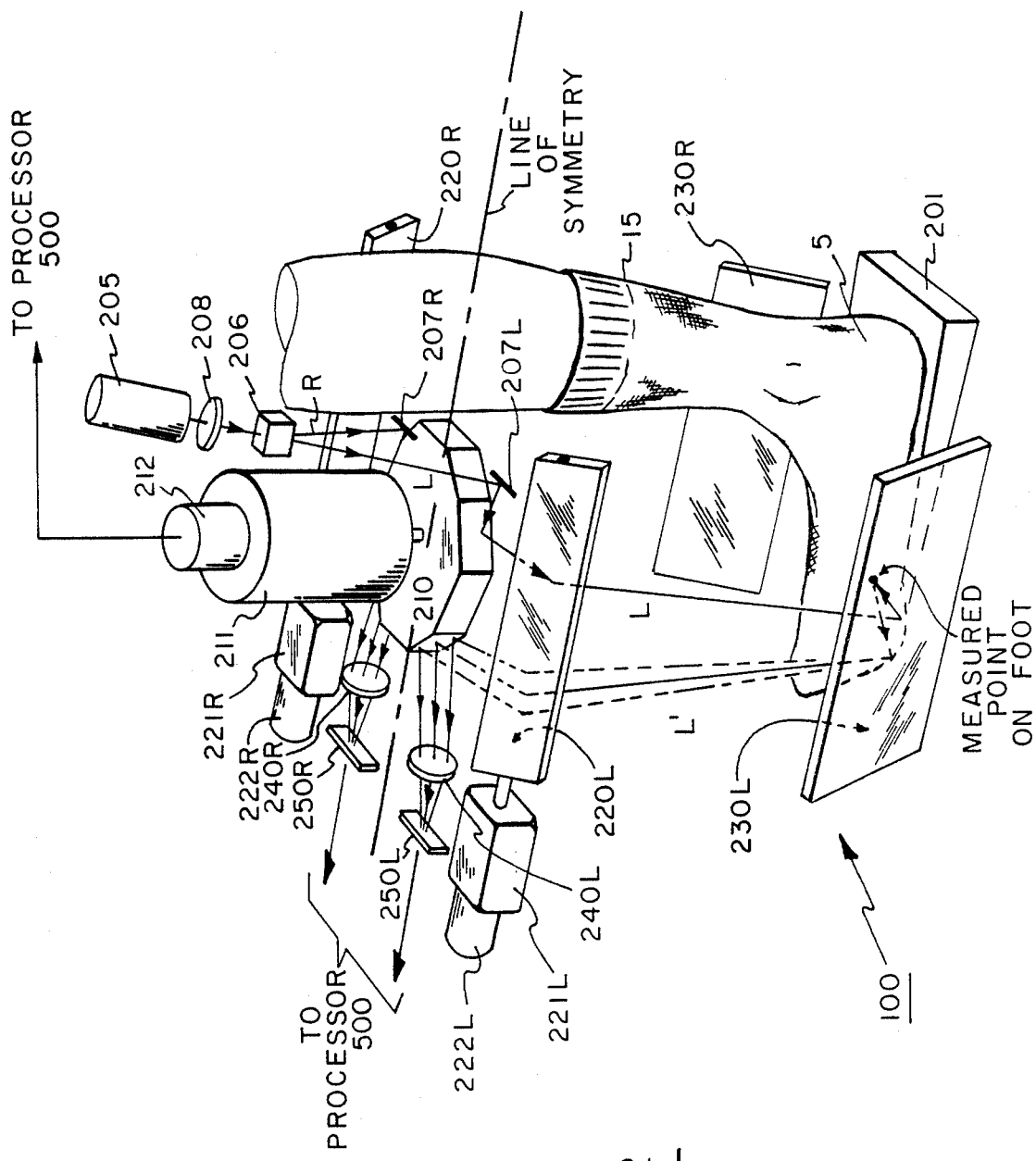
FIG. 2 is perspective view of a portion of an apparatus in accordance with a preferred embodiment of the invention, and which can be used to practice the method of the invention.

Referring to FIG. 2, there is shown a diagram of the optical system 100 in accordance with the preferred embodiment of the invention. A foot 5 is at an inspection position generally defined as the region over a wedge 201, which can be of adjustable height. An elastic sock 15 is worn on the foot. The sock can be made using any suitable diffusely reflective material, for example, a white (or the color of the light used) elastic weave. Preferably, the measurements hereof are taken with the subject applying his or her weight on the foot, so that its dimensions are measured under this condition. However, it will be understood that measurements can be taken in either or both weight-on or weight-off conditions, and with or without the diffusely reflective sock.

A source of collimated light, for example a low power semiconductor laser 205, is provided. After conventional beam-shaping optics 208, the laser beam is split into two beams by beam splitter 206. Cne of the beams, referred to as the left-side beam L, is directed past the left side of the subject's leg, toward a rotating faceted scanner 210. The other beam, referred to as the right-side beam, R, is reflected from mirror 207 past the right side of the subjects leg, and impinges on a different facet of the scanner 210. In the present embodiment, the scanner 210 is a 10-facet polygon reflective scanner. This scanner is advantageous in that the input beam can be at a skew angle to the polygon line of symmetry, and room for the subject's leg is allowed without interference with components of the system. Advantages also accrue with regard to the scan duty cycle and with regard to the angular range of the return beam which, as will be seen, is also reflected off this scanner toward the detectors. The scanner 210 is driven by polygon drive motor 211. A shaft encoder 212 is used to generate a signal that is coupled to the processor 500 (FIG. 1), so that the processor receives information concerning the scan position of the rotating polygon scanner 210.

After reflection from a facet of the scanner 210, the beam L is reflected from a galvanometer mirror 220L, which oscillates under control of a galvanometer driver 221L. The galvanometer driver also has a position encoder 222L which generates a signal that is coupled to the processor 500, so that the status of the galvanometer mirror scan is available at the processor. The beam L is then reflected off fixed mirror 230L, which is positioned to the left of the subject's foot. [In this manner, important information concerning the arch and instep of the foot can be obtained.] The beam L then impinges on the foot, is reflected therefrom, and the return beam L' is then reflected back off the fixed mirror 230L, the galvanometer mirror 220L, and a different facet of the rotating polygon scanner 210. The return beam L' is then focused by lens 240L upon a linear detector 250L, which may be, for example, of the continuous element type manufactured by Hamamatsu Corp. Alternatively, a discrete element detector could be utilized. The detector is operative to produce an output signal indicative of the position on the detector upon which the beam impinges. This information is coupled to the processor 500, and can be used to obtain the beam angle; that is, the angle subtended by beams L and L' in the region between mirrors 220 and 230, for example. A process of triangulation can then be used to determine the distance, designated z, of the reflection point on the foot from a predetermined reference, for example a vertical plane through the line of symmetry. The combination of the rotating polygon scanner 210 and the galvanometer mirror 220 serve to scan the beam in a selected predetermined pattern on the foot surface, depending upon the distances, angles, and scan rates selected. At each point, a triangulation angle results in a transverse displacement on the linear detector which can be converted to a z distance; that is, a z coordinate for the foot for a particular x,y two-dimensional scan reference in a vertical plane. The detector has sufficient vertical extent to allow for the small vertical displacement of the beam. The method of obtainment of distance information by triangulation is well known in the art and reference can be made, for example, to an article entitled "Laser Range Finder Based on Synchronized Scanners", M. Rioux, Applied Optics, Vol. 23, No. 21, 1984.

The beam R follows a similar path on the right side optics which includes galvanometer mirror 220R and associated galvanometer drive 221R and position encoder 222R and fixed mirror 230R. The return beam is received by linear detector 250R. It will be understood that as an alternative to simultaneous left and right operation as described, sequential left and right measurement can be conducted, in which a single laser and a single detector are time shared with appropriate left/-right portion light switching means.

Figure 3:
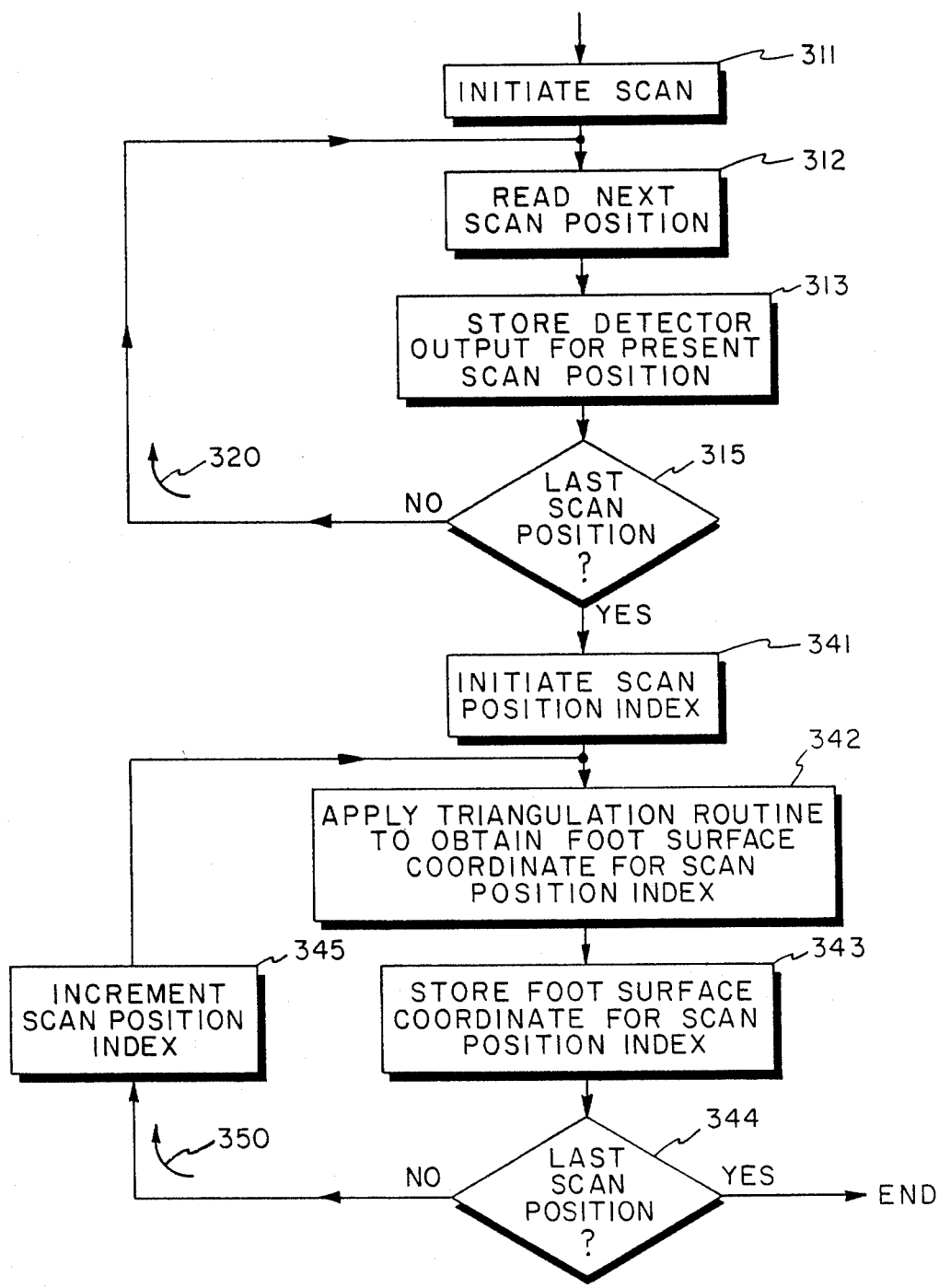
FIG. 3 is a flow diagram of a routine, in accordance with an embodiment of the invention, for programming a processor embodiment to implement the technique of the invention.

Referring to FIG. 3, there is shown a flow diagram of a routine of the processor 500 for controlling the obtainment of the foot coordinate data. It will be understood that the routine as set forth can be for the beam L or the beam R in sequence, or for simultaneous operation with two data acquisition subsystems or with time sharing of the data acquisition and storage. The block 311 represents the initiation of a scan, which can be, for example, at the occurrence of particular combination of signals from the position encoders of the scanners, or from a preset start position. The next scan position is read (as represented by the block 312), and the detector output position is stored at an address determined by the scan position. Inquiry is then made as to whether or not the last scan position has been reached (diamond 315). If not, the next scan position is read (block 312), the detector data is stored, and the loop 320 continues until a full set of data is obtained.

The next phase of the flow diagram involves determination of the z-value for each (x,y) scan coordinate position. The scan position index is initiated, as represented by the block 341. The triangulation routine is then applied to obtain the foot surface coordinate point (that is, the z-value for the particular x,y scan point) for the present scan position index, as represented by the block 342. The foot surface coordinate is then stored (block 343), and inquiry is made (diamond 344) as to whether or not the last scan position has been reached. If not, the scan position index is incremented (block 345), and loop 350 is continued until all of the scanned foot coordinates have been stored. In a sequential process, the routine can then be repeated for the data from the other side of the foot. Also, if desired, redundancy of information can be resolved by known matching methods which will improve the model at the interface between the left and right side data.

The invention has been described with reference to a particular preferred embodiment, but variations within the spirit and scope of the invention will occur to those skilled in the art. For example, while the coordinates determined in accordance with the invention are illustrated as being used in making a shoe last having a shape which depends on said coordinates it will be understood that the determined coordinates can be used as the basis for a shoe fabrication process that does not necessarily employ a last.

We claim:

1. A method for making a custom shoe last, based on a particular subject's foot, comprising the steps of:
   placing a foot at an inspection position;
   directing a light beam at the foot;
   scanning the light beam in a predetermined pattern over the surface of the foot;
   detecting, at a position detector, the light beam reflected from the foot;
   determining surface coordinates of the foot as a function of the detector output;
   storing the determined surface coordinates; and
   forming a shoe last having a shape which depends on the stored coordinates.

2. The method as defined by claim 1, wherein said scanning step comprises scanning in two dimensions.

3. The method as defined by claim 1, further comprising the step of applying an elastic diffusely reflecting sock on the foot to be placed at the inspection position.

4. The method as defined by claim 2, further comprising the step of applying an elastic diffusely reflecting sock on the foot to be placed at the inspection position.

5. The method as defined by claim 1, wherein said detector is a linear detector.

6. The method as defined by claim 2, wherein said detector is a linear detector.

7. The method as defined by claim 1, wherein said light beam is directed and scanned over one side of the foot, and coordinates of the foot are determined therefrom; and further comprising the steps of directing a second light beam at the foot, scanning the second light beam in a predetermined pattern over the surtace of the other side of the foot, detecting the second light beam reflected from the foot, determining further surface coordinates of the foot as a function of the detected second beam, and storing the further surface coordinates, the shoe last having a shape which depends on the stored coordinates and the further stored coordinates.

8. The method as defined by claim 1, wherein said light beam is directed and scanned over one side of the foot, and coordinates of the foot are determined therefrom; and further comprising the steps of directing a second light beam at the foot, scanning the second light beam in a predetermined pattern over the surface of the other side of the foot, detecting the second light beam reflected from the foot, determining further surface coordinates of the foot as a function of the detected second beam, and storing the further surface coordinates, the shoe last having a shape which depends on the stored coordinates and the further stored coordinates.

9. The method as defined by claim 1, wherein said surface coordinates are determined by a triangulation technique.

10. The method as defined by claim 1, wherein said light beam is a laser beam.

11. Apparatus for determining surface coordinates of a foot, from which a custom shoe can be made, comprising:
    a base for receiving a foot, and defining an inspection position over said base;
    means for generating a beam of light;
    means for scanning said beam in a predetermined pattern over the surface of a foot at the inspection position;
    a position detector for detecting the light beam reflected from the foot;
    means for determining surface coordinates of the foot as a function of the output of the detector; and
    means for storing the determined surface coordinates;
    whereby a custom shoe can be made having a shape that depends on the stored surface coordinates of the foot.

12. Apparatus as defined by claim 11, wherein said means for scanning said beam comprises means for implementing a two-dimensional scan of said beam.

13. Apparatus as defined by claim 12, wherein said means for scanning said beam comprises a rotating faceted reflector for scanning said beam in one dimension, and an oscillating reflector for scanning said beam in a second dimension.

14. Apparatus as defined by claim 13, wherein said rotating scanner is disposed above the inspection position, and said oscillating reflector is disposed to one side of the inspection position; the beam of light being reflected from the rotating scanner to the oscillating reflector to the foot, and the beam reflected from the foot being thereafter reflected back to the oscillating reflector, the rotating scanner, and then the detector.

15. Apparatus as defined by claim 14, wherein a fixed mirror is disposed below said oscillating reflector in the optical path between the oscillating reflector and the foot.

16. Apparatus as defined by claim 11, further comprising means for obtaining a second beam of light; second scanning means for scanning said second beam in a predetermined pattern over the surface of a foot at the inspection position; and a second position detector for detecting the second light beam reflected from the foot; and wherein said means for determining and storing surface coordinates are also responsive to the output of said second detector.

17. Apparatus as defined by claim 12, further comprising means for obtaining a second beam of light; second scanning means for scanning said second beam in a predetermined pattern over the surface of a foot at the inspection position; and a second position detector for detecting the second light beam reflected from the foot; and wherein said means for determining and storing surface coordinates are also responsive to the output of said second detector.

18. Apparatus as defined by claim 17, wherein said scanning means and said second scanning means have a common rotating faceted reflector disposed above the inspection position for scanning said beams in one dimension, and said scanning means and said second scanning means have respective oscillating reflectors on opposing sides of the inspection position for respectively scanning said beams in a second dimension.

19. A method for obtaining coordinates of the surface of a foot, from which a shoe can be made, comprising the steps of:

placing a foot at an inspection position;
directing a light beam at the foot;
scanning the light beam in a predetermined pattern over the surface of the foot;
detecting, at a position detector, the light beam reflected from the foot;
determining surface coordinates of the foot as a function of the detector output; and
storing the determined surface coordinates; whereby said coordinates can be used in making a shoe having a shape which depends on the stored coordinates.

20. The method as defined by claim 19, wherein said scanning step comprises scanning in two dimensions.

21. The method as defined by claim 19, further comprising the step of applying an elastic diffusely reflecting sock on the foot to be placed at the inspection position.

22. The method as defined by claim 20, wherein said light beam is directed and scanned over one side of the foot, and coordinates of the foot are determined therefrom; and further comprising the steps of directing a second light beam at the foot, scanning the second light beam in a predetermined pattern over the surface of the other side of the foot, detecting the second light beam reflected from the foot, determining further surface coordinates of the foot as a function of the detected second beam, and storing the further surface coordinates.

* * * * *